May 24, 1966 — J. H. HUNTLEY — 3,252,738
WHEEL COVER
Filed July 10, 1964 — 2 Sheets-Sheet 1
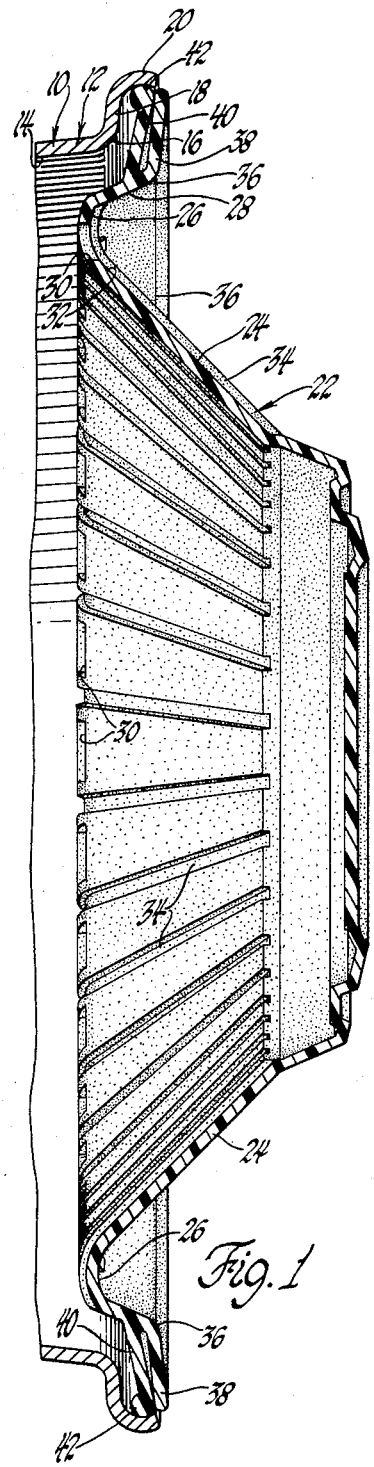
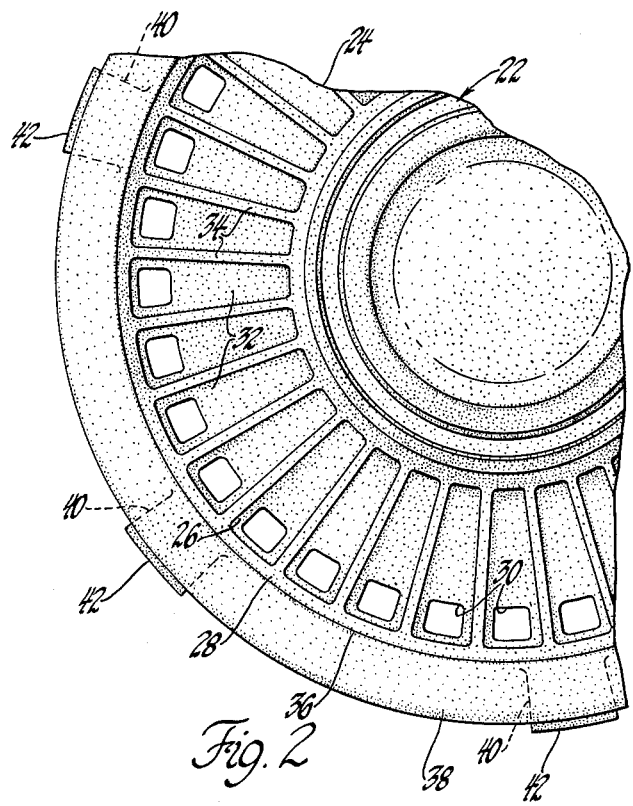
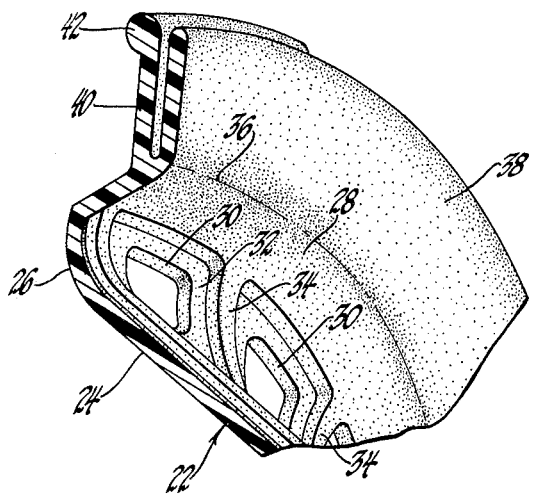
INVENTOR.
John H. Huntley
BY
Herbert Furman
ATTORNEY May 24, 1966 J. H. HUNTLEY 3,252,738
WHEEL COVER
Filed July 10, 1964 2 Sheets-Sheet 2
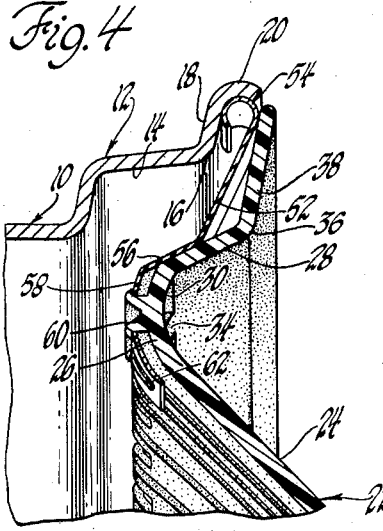
Fig. 4
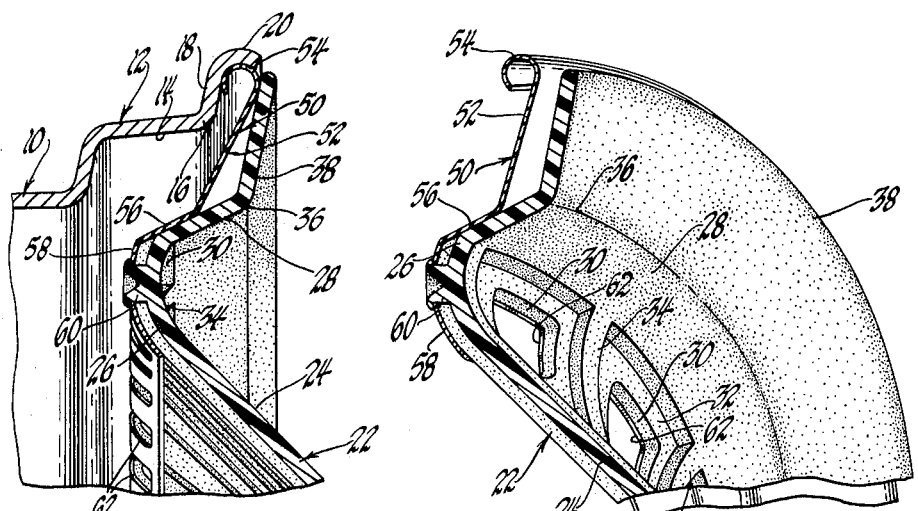
Fig. 5
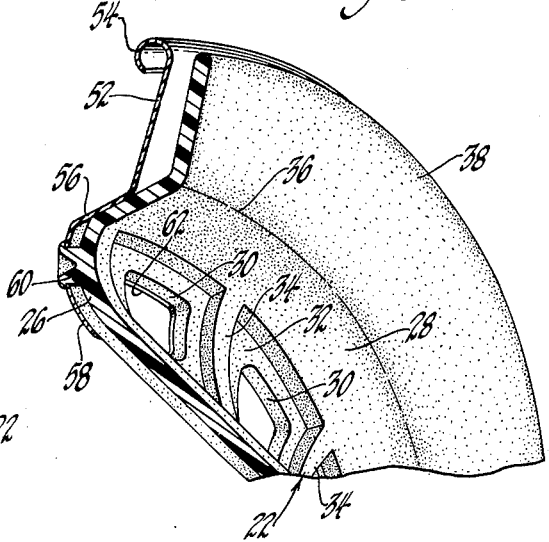
Fig. 6
Fig. 7
INVENTOR.
John H. Huntley
BY
Herbert Furman
ATTORNEY 3,252,738
WHEEL COVER
John H. Huntley, Detroit, Mich., assignor to General
  Motors Corporation, Detroit, Mich., a corporation of
  Delaware
Filed July 10, 1964, Ser. No. 381,697
4 Claims. (Cl. 301—37)

This invention relates to wheel covers and more particularly to wheel covers having improved retaining means for mounting the cover on a vehicle wheel.

One feature of this invention is that it provides a wheel cover having an outer marginal portion adapted to be located adjacent the terminal flange of wheel and a retention flange structure adapted to be fulcrumed on an intermediate radially facing axially extending flange portion of the cover and being engageable with the terminal flange of the wheel to retain the cover in place on the wheel. Another feature of this invention is that the retention flange structure is formed integral with the intermediate cover flange portion. A further feature of this invention is that the retention flange structure includes an axially inwardly and radially outwardly extending beaded outer margin to permit easier assembly of the cover to the wheel. Yet another feature of this invention is that the retention flange structure includes an intermediate portion slidably fulcrumed on the intermediated flange portion of the cover and a radially inner portion secured to a radially inner portion of the cover to permit the retention flange structure to move axially of the cover as well as fulcrum thereon upon assembly of the cover to the wheel. Yet a further feature of this invention is that the cover and retention flange structure are formed of resilient plastic material. Still another feature of this invention is that the retention flange structure is formed of metal and the cover body is formed of plastic or similar resilient material.

These and other features and advantages of the wheel cover of this invention will be readily apparent from the following specification and drawings wherein:

FIGURE 1 is a side sectional view of a cover according to this invention mounted on a portion of a vehicle wheel;

FIGURE 2 is a partial front elevational view of the cover of FIGURE 1;

FIGURE 3 is a partial perspective view of the cover of FIGURE 1;

FIGURE 4 is a view showing a modified cover mounted on a portion of a vehicle wheel;

FIGURE 5 is a partial perspective view of the cover of FIGURE 4;

FIGURE 6 is a view similar to FIGURE 4 showing a further modification of the cover; and FIGURE 7 is a partial perspective view of the cover of FIGURE 6.

Referring now particularly to FIGURES 1 through 3 of the drawings, a vehicle wheel designated generally 10 is of conventional structure and includes the usual wheel body, not shown, and wheel rim 12. Rim 12 includes an axially extending radially facing intermediate flange 14 which merges on an arcuate juncture or rib 16 with a generally extending axially facing flange 18 terminating in a generally arcuately shaped lip or flange 20.

The cover includes a cover body designated generally 22 having a central crown portion 24 merging on a generally axially outwardly opening channel portion 26 into a generally radially facing axially outwardly extending flange portion 28. The channel portion 26 is provided with a plurality of equal spaced openings 30, each of which is located in an axially inwardly depressed portion 32 bounded by radial ribs 34. The flange portion 28 of the cover merges on an arcuate juncture or rib 36 with a generally radially and axially outwardly extending marginal flange or portion 38 which is slightly smaller in size than the smallest diameter of the lip or flange 20 of the wheel rim.

A plurality of retention flanges or flange portions or fingers 40 are formed integral with the cover body 22 and have the inner margins thereof fulcrumed or joined to the flange portion 28 generally immediately adjacent to the juncture or rib 28 which joins the flange portion 28 to the flange 38. The outer margins of the flange portions 40 include an integral axially inwardly and radially outwardly extending beaded edge or portion 42, the outer diameter of the portions 42 being slightly greater than the greatest inner diameter of the inner surface of the wheel flange 20 as well as being greater than the outer diameter of the flange 38, as can be seen in FIGURES 2 and 3. Prior to assembly of the cover on the wheel, the flange portions 40 are located in generally parallel axially inwardly spaced relationship to the flange 38.

When it is desired to mount the cover on the wheel 10, the flange portions 40 are generally aligned with the opening of the wheel defined by the flange 20 and thereafter the cover is moved axially inwardly of the wheel. The beaded portions 42 of the flange portions 40 will slide over the outer edge of the flange portion 20 and move inwardly into engagement with the inner surface thereof as the flange portions fulcrum about their inner margins on the flange portion 28 of the cover body and will move or shift axially outwardly of the cover into engagement with the inner surface of the flange portion 38 of the cover to thereby place the flange portions 40 under axially and radially inwardly directed stresses to securely mount the cover on the wheel. The flange portion 38 of the cover will be located slightly axially outwardly of the flange 20 although within the annular confines thereof.

It will be noted that the ribs 34 extend at their radially outer ends to the flange portion 28 so as to brace the flange portion 28 and cooperate with the flange portion 28 and channel portion 26 in resisting the stresses placed upon the flange portions 40 to thereby cooperate with the flange portions 40 in retaining the cover in place on the wheel. In the specific embodiment shown, six flange portions 40 are provided, although it will be understood that more or less may be provided as desired.

FIGURES 4 and 5 show a modification of the cover and like numerals have been used for like parts. In this modified form of the invention, an annular retention flange or band 50 is formed of thin metal and includes a generally radially outwardly extending flange portion 52 which terminates in a reverse bent beaded portion 54. The inner margin of the portion 52 is joined to a generally radially and axially inwardly extending portion 56 which slidably bears on the outer surface of the flange portion 28 of the cover body and terminates in a generally axially outwardly extending arcuately shaped portion 58 which generally corresponds in cross section to the channel portion 26 of the cover body and slidably seats thereagainst. A plurality of the ribs 34 of the cover body are provided with generally axially inwardly extending stub portions 60 at spaced locations around the channel portion 26, with these stub portions 60 being received within openings provided in the portion 58 of band 50 and being thereafter headed over to hold the portions 58 in engagement with the inner surfaces of the depressed portions 32 of the cover body and hold the flange portion 56 in engagement with the flange portion 28 of the cover body so as to fulcrum the inner margin of the flange portion 52 on the flange portion 28. The portion 58 is further provided with openings 62 which correspond to the openings 30 of the cover body.

The mounting of this cover on the wheel will be the same as that previously described in conjunction with the cover shown in FIGURES 1 through 3 of the drawings.

Referring now to FIGURES 6 and 7, another modification of the cover of this invention will be described and like numerals will be used for like parts. This modification is substantially the same as that previously described in conjunction with FIGURES 4 and 5 except that instead of a continuous band 50, a plurality of separate flange or finger portions 62 are provided, with the portions 62 being mounted on the cover 22 in the same manner as the band 50 and functioning in the same manner as the band 50.

Thus, this invention provides an improved wheel cover.

I claim:

1. In combination with a vehicle wheel including a radially facing axially extending terminal flange, a wheel cover comprising, a cover body having an intermediate radially facing axially extending annular flange portion merging into an annular marginal radially extending axially facing flange, and a retention flange located in axially inwardly spaced generally parallel relationship to said marginal flange and having a radially inner portion thereof fulcrumed on said cover intermediate flange portion, the outer margin of said retention flange having a diameter slightly greater than the diameter of said wheel flange and including an axially inwardly and radially outwardly extending beaded portion engageable with said wheel flange, said retention flange being fulcrumed about its inner margin on said cover flange portion for movement thereof toward and into engagement with said marginal flange to locate said marginal flange immediately adjacent said wheel flange and place said retention flange under generally radially inwardly directed stresses upon engagement thereof with said wheel flange.

2. In combination with a vehicle wheel including a radially facing axially extending terminal flange, a wheel cover comprising, a cover body having an intermediate radially facing axially extending annular flange portion providing the axially outer wall of an axially inwardly dished portion and merging into a marginal radially extending axially facing flange, and a retention flange located in axially inwardly spaced generally parallel relationship to said marginal flange and having an intermediate shoulder portion thereof fulcrumed on said cover flange portion, the radially inner portion of said flange portion being complementary to said cover body dished portion and being secured thereto, the outer margin of said retention flange having a diameter slightly greater than the diameter of said wheel flange and including an axially inwardly and radially outwardly extending beaded portion engageable with said wheel flange, said retention flange shoulder fulcruming on said cover flange portion and moving into engagement with said marginal flange to locate said marginal flange portion immediately adjacent said wheel flange and place said retention flange under generally radially inwardly directed stresses upon engagement thereof with said wheel flange.

3. The combination recited in claim 1 wherein said cover body and said retention flange are formed integral with each other of resilient plastic material.

4. The combination recited in claim 2 wherein said cover body is formed of resilient plastic material and said retention flange is formed of metal.

References Cited by the Examiner

UNITED STATES PATENTS

| 2,421,756 | 6/1947 | Lyon | 301—37 |
| 2,624,638 | 1/1953 | Lyon | 301—37 |
| 2,812,215 | 11/1957 | Waite | 301—37 |
| 2,998,105 | 7/1961 | Lyon | 301—37 X |
| 3,055,330 | 9/1962 | Lyon | 301—37 X |
| 3,167,358 | 1/1965 | Demrick | 301—37 |

FOREIGN PATENTS

| 596,044 | 4/1960 | Canada. |

BENJAMIN HERSH, *Primary Examiner.*

R. J. JOHNSON, *Assistant Examiner.*